Nov. 11, 1958     R. R. LOVE     2,859,889
EASY LOADING SHIFTING AXLE TRAILER

Filed May 15, 1957     3 Sheets-Sheet 1

INVENTOR
Richard R. Love

BY
ATTORNEYS

INVENTOR
Richard R. Love

Nov. 11, 1958    R. R. LOVE    2,859,889
EASY LOADING SHIFTING AXLE TRAILER
Filed May 15, 1957    3 Sheets-Sheet 3

INVENTOR
Richard R. Love
BY
ATTORNEYS

United States Patent Office 2,859,889
Patented Nov. 11, 1958

2,859,889

EASY LOADING SHIFTING AXLE TRAILER

Richard R. Love, Buhl, Idaho

Application May 15, 1957, Serial No. 659,321

20 Claims. (Cl. 214—505)

This invention relates to trailers and in particular to an easy loading trailer.

More specifically this invention is directed to a trailer having a shifting axle facilitating loading of the trailer or use of the trailer as a ramp in association with another vehicle for loading the latter.

Trailers which are used for transportation of road paving machinery of the wheel type for example, are difficult to load as they are commonly constructed. Many require a number of appenditures which are carried around with the trailer and which must be set up to the rear of the trailer before loading or unloading operations can commence. Attempts to improve this situation have been made and trailers embodying means for shifting the axles thereof for placement of the rear end of the trailers adjacent the ground to facilitate loading and unloading thereof have been devised. There have also been developed other means for tilting trailers to facilitate loading and unloading. These are not satisfactory, however, and one of the main purposes of my invention is to provide an easy loading shifting axle trailer which will be more suited for actual use and day to day service than similar trailers heretofore known.

For obvious reasons a trailer is constructed so that the center of gravity is low. With a shifting axle type construction this becomes difficult. Particularly with trailers heretofore known to me, the construction is such usually that the trailer platform bed is undesirably high. This not only renders the trailer less stable in transit, but also the shifting axle feature is thus somewhat self-defeating in that the height of the trailer bed requires that the vehicle or other material to be carried be raised or lowered a greater distance from the ground in order to load or unload than with a conventional trailer. Accordingly an object of this invention is to provide a shifting axle trailer having a low center of gravity and with which the bed is not so positioned that the height of the trailer is undesirably increased rendering loading more difficult than with a conventional trailer.

Another factor which is detrimental to the use of shifting axle type trailers is the complexity of the structure involved. Complex structure results in increased cost and increased possibility of damage and malfunction, as well as an increase in the problems of oiling and maintenance. Accordingly an object of the invention is to provide a shifting axle trailer which is of relatively simple construction as compared to heretofore known trailers and yet which renders the loading and unloading of the trailer a relatively simple task as compared with trailers without a shifting axle feature.

A further object of the invention is to provide a shifting axle trailer in which wheels are received in housings protecting the trailer and load from dirt and other undesirable materials.

Yet a further object of the invention is to provide a shifting axle trailer with a relatively simple means for moving the axles relative to the trailer which is reliable and which provides positive safe operation.

Another object of the invention is to provide a shifting axle trailer as described above with a simple yet positive and effective locking means for preventing the axle shifting when such is not desired.

Yet a still further object of the invention is to provide a relatively light, simple, easy to operate trailer which is also relatively strong and with which ample rigidity can be obtained without excessive weight.

It is still another object of the invention to provide a shifting axle trailer embodying a tilting trailer bed with simple yet effective and safe bed hold-down means preventing tilting when desired.

Some of the heretofore known constructions are such that the axle positioning means is not satisfactory for extended rough surface. Accordingly it is also an object of the instant invention to provide adequate positioning and stabilizing means for the tractor axles.

It is still a further object of the invention to provide a trailer in accordance with the last mentioned object in which the stabilizing means and the means for shifting the axle involves a relatively simple structure yet which is reliable.

Still another object of the invention is to provide shifting axle structure as set forth in the heretofore mentioned objects with which there will be no binding, with which dirt will not interfere with shifting of the axles, and which will otherwise be reliable and easy to operate when desired.

Yet a still further object of the invention is to provide a shifting axle trailer as set forth above in which the trailer embodies main frame members and the load from the axles is directly transmitted to the main frame members.

Yet a further object of the invention is to provide a shifting axle trailer in which the trailer axles embody bearing means which is shiftable lengthwise of the trailer.

A further object of the invention is to provide a wheeled trailer having a shifting axle and including bearing means cooperable with the axle and the trailer frame for rotatably connecting the axle to the frame during transit and trackways adjacent the normal position of the trailer wheels engageable by the trailer wheels upon shifting of the axle of the trailer longitudinally thereof for transference of the weight of the trailer from the bearings to the wheels. The load then is transmitted directly from the trailer to the wheels and not through the bearings.

Yet a further object is to provide a trailer as set forth in the preceding objects wherein the trailer is provided with wheel wells in which the wheels are normally received and the wheel wells are contiguous with a trackway adjacent the wells adapted to bear on the wheels during shifting of the axle.

A further object of the invention is to provide a shifting axle trailer the body of which can be tilted for loading and unloading which is adaptable for use as a portable ramp.

Still another object of the invention is to provide a shifting axle trailer which is adapted to provide a ramp which is supported at all of its four corners in a solid, rigid, and safe manner.

Yet a further object of the invention is to provide a shifting axle trailer utilizable for loading or unloading with which loading or unloading can be accomplished while the trailer is hitched to a towing vehicle.

A further object is to provide a trailer as set forth in the last mentioned object wherein there will be no load on the hitch during loading or unloading operations of the trailer. With a trailer constructed in accordance with the invention, the trailer can be coupled or uncoupled while the trailer is tilted without the use of a clumsy hitch jack or similar means such as necessary with heretofore known constructions. With the instant invention, the trailer can be coupled or uncoupled when tilted without the difficulty heretofore experienced.

Yet a further object of the invention is to provide a tilting bed trailer in which the front of the bed will remain low even though the axle has been shifted. This makes it possible to utilize a cable attached to a towing vehicle winch for example which can be stretched back directly over the trailer for use in loading the trailer. If this were done with heretofore known devices and the cable were tightened the bed would be pulled down in the front making it impossible to load.

These and other objects and advantages will become apparent from the following description and the accompanying drawings in which.

Similar reference characters in the several views indicate the same parts.

Figure 1:
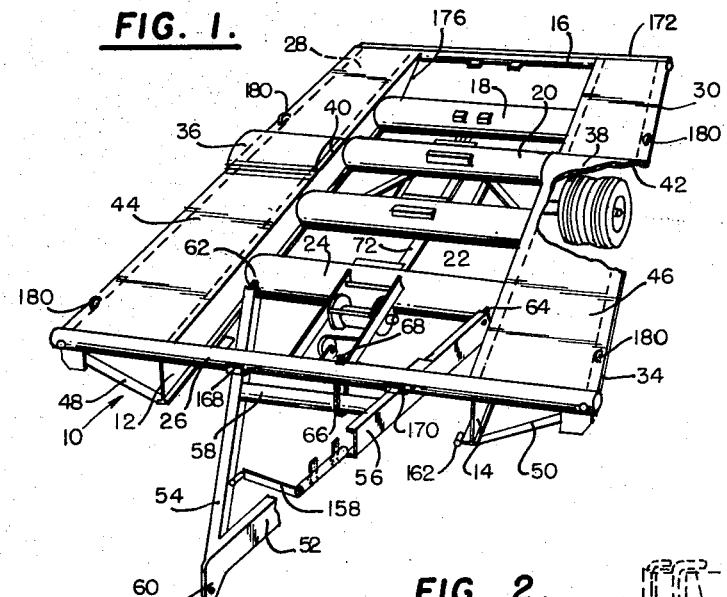
Figure 1 is a perspective view of a trailer constructed in accordance with the invention with some portions being broken away in the figure to facilitate understanding of the construction.

Referring now particularly to the drawings:

A trailer constructed in accordance with the invention in its illustrated embodiment comprises a frame 10. The frame is formed of spaced side rails 12 and 14 connected by tubular lateral cross members 16, 18, 20, 22, 24 and 26. Rear outer side longitudinal members 28 and 30 are connected to the rear tubular cross member 16 and front outer side members 32 and 34 are connected to the front tubular cross member 26. The front and rear outer longitudinal members are connected by wheel well forming plates 36 and 38 which form wheel wells 40 and 42. The wheel wells are also connected to the spaced side rails and are contiguous with a pair of platforms 44 and 46 which extend to the front tubular cross member. Front braces 48 and 50 add stiffness to the assembly.

A hitch frame 52 is pivotally connected to tubular cross member 24. The hitch frame comprises the two side members 54 and 56, a cross brace 58 and hitch means 60 which can be of any convenient form. The side members are pivotally connected to the flanges 62, 64. A bed hold-down chain 66 has one end fastened to the tubular cross member 26 and its other end removably connected to swivel nut 70 with the chain extending around the cross member 58. The hitch frame is illustrated in its normal, load transmitting, position with respect to the trailer frame in Figure 1. Towing force is transmitted through the hitch frame to the trailer frame when the hitch frame is in its normal position.

Slide 72 interconnects the cross members 18, 20, 22, 24 and 26. A pair of laterally aligned yokes 74 and 76 are positioned adjacent the wheel wells and connected to the side rails 12 and 14. Axle 78 is provided with a pair of bearings 80 and 81 which are received within yokes 74 and 76 and supportingly engage the side rails 12 and 14 in the normal carrying position. The bearings 80, 81 preferably comprise flanged rollers having flanges 84 and 86 which prevent lateral shifting of the axle.

A pair of angled front torque arms 88 and 90 are pivotally connected to the axle by pivots 92 and 94. These pivots are formed by a hinge type construction as illustrated but it is obvious that some other form of pivotal connections can be used. The torque arms extend forwardly and terminate in flanges 96 and 98. The latter are pivotally connected to a slide 100. The slide has a slot construction adapted to cooperate with the T-shaped slide track rail 72. The flanges 96 and 98 are seen to be pivotally connected to the slides by pin 102.

The axle is also connected to a pair of rear torque arms 106 and 108, the connection between the rear torque arms and the axle being rigid instead of pivotal and braces 110 and 112 being provided to lend rigidity. The rear torque arms are pivotally connected to a slide 114 constructed similar to slide 100 with the connection between the torque arms 106 and 108 being made through means of flanges 116 and 118 connected to the torque arms by a nut and bolt 120, 122. Slide 114 is slotted similarly to slide 100 and thus has a pair of flanges overlying track 72.

Figure 2:
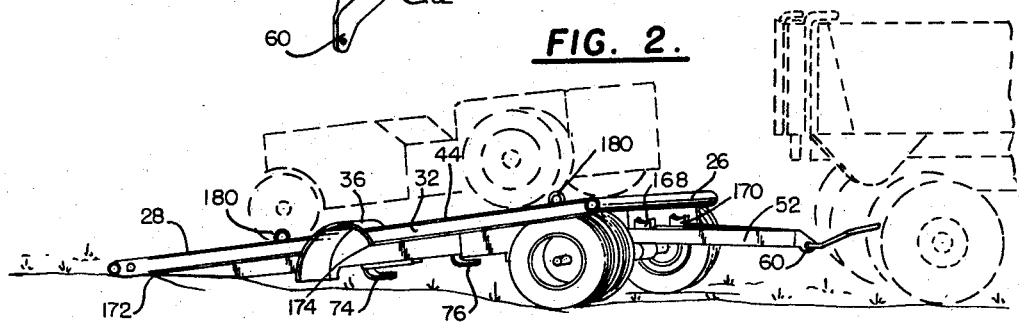
Figure 2 is a perspective view with the axle shifted from the position shown in Figure 1.
Figure 3:
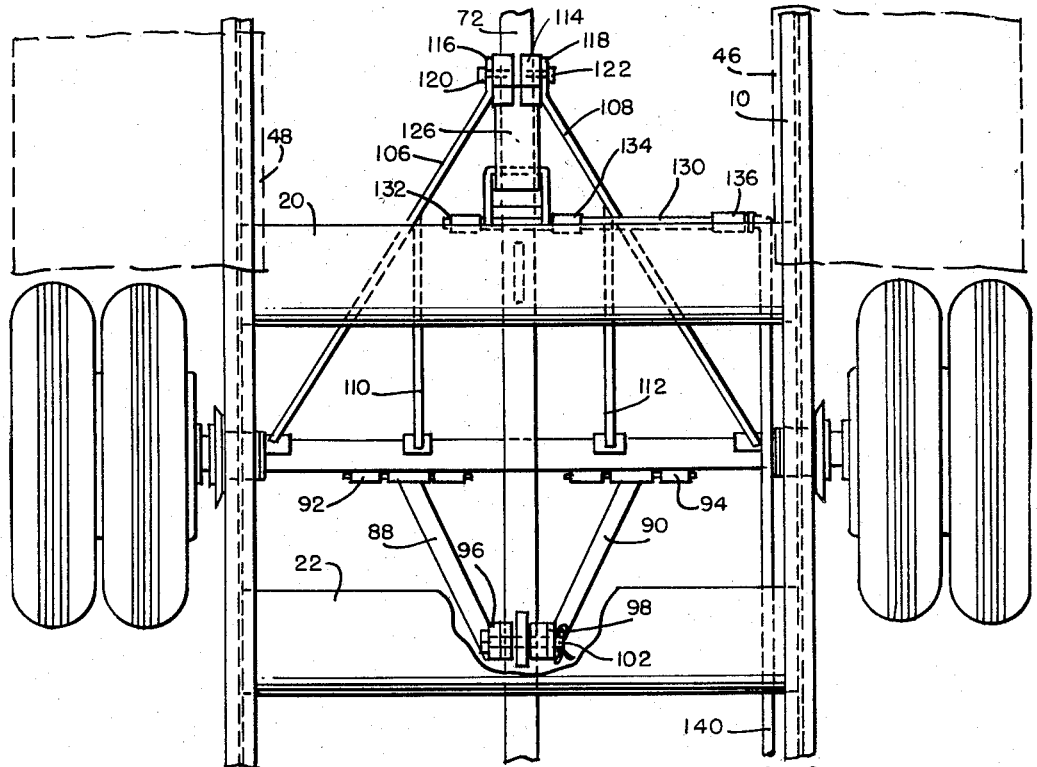
Figure 3 is a fragmentary top plan view with some elements broken away to improve the showing.
Figure 4:
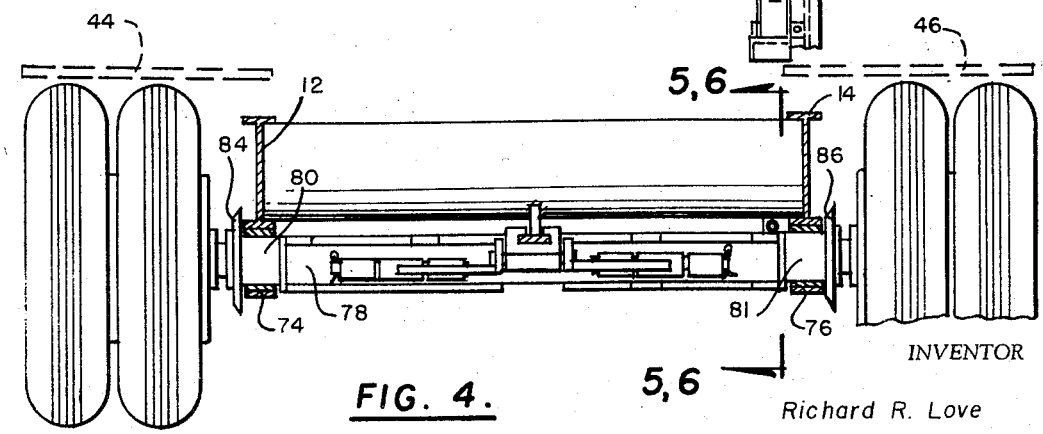
Figure 4 is a sectional view taken along line 4—4 of Figure 3.
Figure 5:
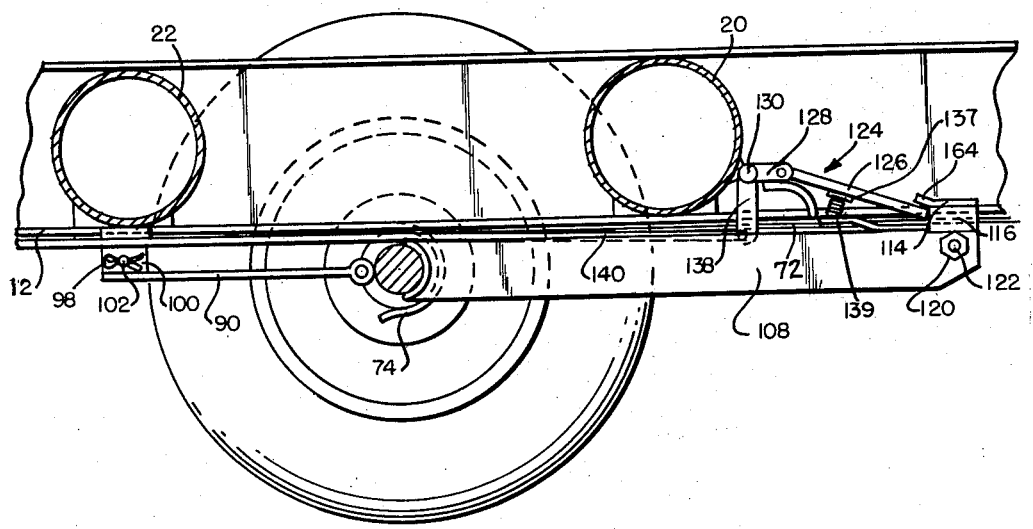
Figure 5 is a fragmentary sectional view taken along line 5—5 of Figure 4.
Figure 6:
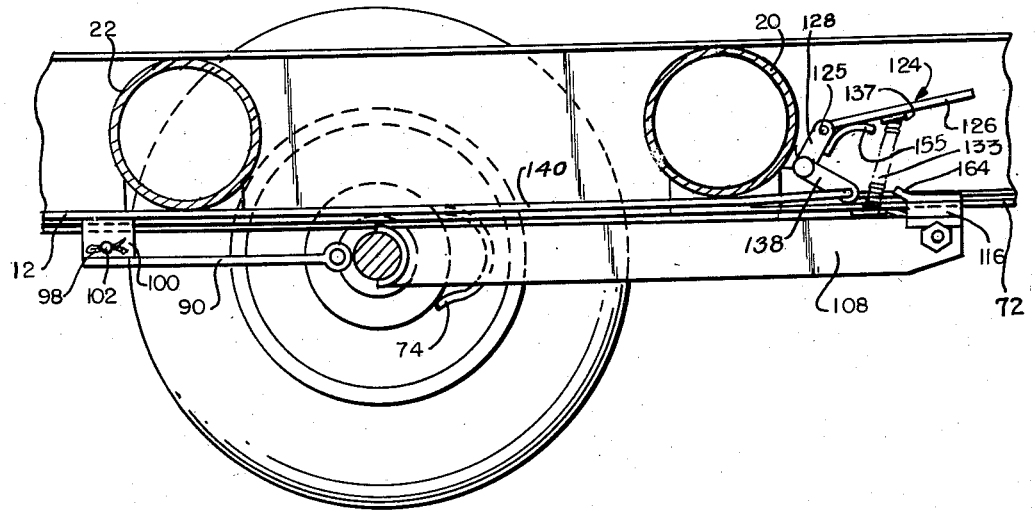
Figure 6 is a sectional elevational view taken along line 6—6 of Figure 4 with the elements being shown in a different relationship than that illustrated in Figure 5.

The elements forming the axle shifting arrangement are indicated in a neutral or normal position in Figures 3 and 5, while in Figures 6 and 2 they are shown out of normal position and in a position assumed for loading. The elements are held in a normal position by a lock 124 consisting of a plate 126 pivotally connected to a strap 128 by means of axle 125. Strap 128 is in turn connected to a shaft 130 supported in bearings 132, 134 and 136. A crank arm 138 is connected to shaft 130 and pivotally connected to a rod 140. Furthermore, the rod 140 is provided with a threaded end 142. A spring 133, of the extension type, is connected to a flange 137 on plate 126 and a flange 139 attached to track 72. The spring thus urges clockwise rotation of plate 126 (as viewed in Figures 5, 6 and 8).

Figure 7:
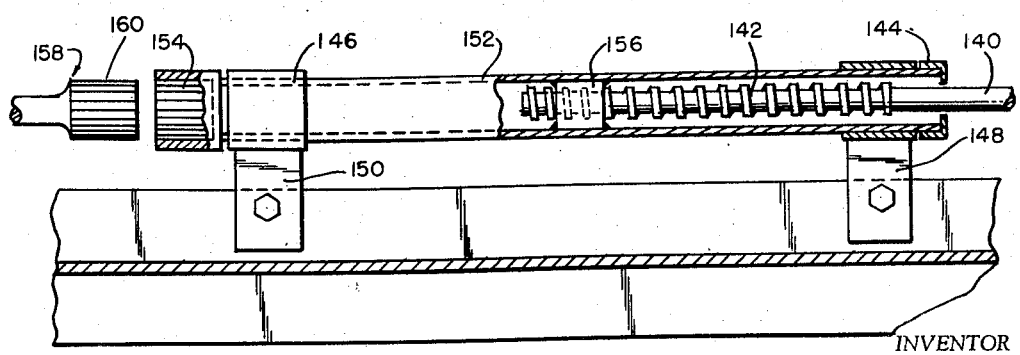
Figure 7 is a fragmentary elevational view of the lock illustrated in Figures 5 and 6.

Referring particularly to Figure 7, a pair of journals 144 and 146 are connected to the side rail 14 by straps 148 and 150, and a shaft 152 is rotatably supported in journals 144 and 146. The end of the shaft is provided with a splined sleeve 154. Also shaft 152 is provided with a nut 156 integrally connected to the shaft and in mesh with the screw threads 142 of shaft 140. The crank 158 has a splined end 160 which is adapted to be engaged with the splined sleeve 154 when the crank is inserted through the front crank carrier 162 and slid rearwardly into engagement with sleeve 154. When in the latter relationship crank 158 can be rotated causing rotation of shaft 152 and extension or retraction of rod 140. This will rotate shaft 130 to raise or lower lock 124. A lifter plate 155 connected to strap 128 serves to lift plate 126 during unlocking.

Crank 158 is adapted to be carried within side member 56 during transit of the trailer. This is illustrated in Figure 1 where two clips are shown as attached to side member 56 for retaining crank 158 in position. Obviously the crank might be attached to the vehicle in many other ways for storage during transport or while the trailer lock is otherwise not being operated.

Slide 114 is seen to have a projecting flange 164 which extends upwardly therefrom and against which plate 126 is adapted to rest when the lock is in locking position. Lifter plate 155 is adapted to abut track 72 when plate 126 abuts track 72. Thus plate 155 contributes to the strength of the lock when the latter is closed.

Figure 8:
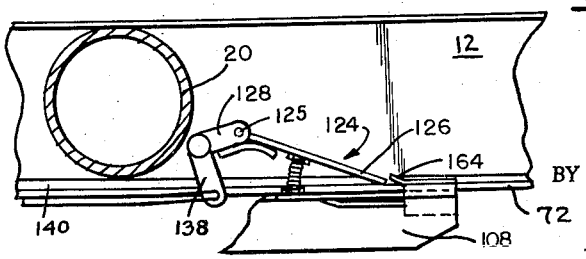
Figure 8 is a fragmentary plan view, with some elements broken away, illustrating a lock operating means.

When the rod 140 is turned to unlock the axle the plate 126 will rotate about its pivotal connection to the strap, with spring 139 tending to hold the plate downwardly, until plate 155 strikes plate 126 (see Figure 8). Thereafter as rod 140 continues to rotate the plate 126 will be lifted above the flange 164 (see Figures 7 and 8).

When the control shaft is turned in the opposite direction the latch plate will come down against the slide track and contact the latter and be pushed backwardly beneath flange 164. This action will force the axle bearings against the yokes and result in a secure locking of the axle in position.

Hitch frame 52 is provided with a pair of half round pedestals 168 and 170 adapted to supportingly engage front tubular cross member 26. A roller 172 is rotatably supported adjacent the rear outer longitudinal members 28. Roller 172 extends across the trailer and facilitates loading and unloading operations.

With the elements as illustrated in Figures 1 and 3, in which the trailer is in a normal carrying position, the trailer can be pulled behind the truck as illustrated in Figure 2 by means of a suitable hitch connection.

To load or unload the trailer the trailer brakes are first set, then the bed hold-down chain 66 is disconnected and the slide 114 unlocked. Next the truck is backed up. As a result the bearings 80 roll out of the yokes 74 along the lower flange of the side rails 12 and 14. When the axle is rolled about an inch forwardly out of its yokes the tires will strike the front of the wheel wells 40 and 42. If the truck continues to back up points 174 will roll up over the tires, with the tires taking the weight off of the rollers. The weight will then be transmitted directly to the tires by the platforms 44 and 46. In practice the brakes are released as soon as points 174 strike the tires, and the truck is further backed up until the wheels are at the front of the trailer. The wheels thus act as rollers carrying the trailer bed on top of them as the trailer moves rearwardly. As the trailer moves rearwardly the rear of the trailer frame tilts downwardly until it rests on the ground.

The side rails 12 and 14 are undercut at the rear as indicated at 176 so that they will be approximately parallel to a level ground surface when the tires have reached the front of the trailer. Thus the trailer is securely supported at its four corners when in this condition.

A vehicle can now be run onto or off of the trailer with ease with roller 172 facilitating this loading and unloading operation. When the loading is completed the truck moves forwardly causing the wheels to roll and the trailer to move forwardly with respect to the axle. The wheels carry the load directly from the platform until the wheels roll off the points 174 into the wells. The brakes can then be applied to insure that the bearings seat securely in the yokes whereupon the lock can be operated through means of the crank 158 to lock the wheels in the carrying position.

The use of the wheels of the vehicle to carry the load during the tilting operation results in a construction which is much lower to the ground than those heretofore known. It should be noticed that in the illustration of Figure 2 the front of the trailer is below the rear of the truck bed, and not substantially above the latter bed when tilted. Thus the trailer can be used to provide a ramp for loading or unloading a truck having a tilt bed. The trailer makes a perfect portable ramp. Again it should be noticed that there will be firm support at the four corners when used as a ramp. When the trailer is supported at the four corners the tilt of the trailer will not change as the load is moved along it.

When used with trucks having power winches the front of the bed is so low that it will not interfere with the winch cable if the latter is stretched back over the trailer. On a conventional tilt bed trailer the front of the bed would strike the cable, and when the cable would tighten the bed would be pulled down at the front making it impossible to use truck power winch loading means with such trailers. A hand operated winch 178 can be provided for hand loading the trailer. Hold downs 180 are provided at spaced intervals to lash the load securely to the trailer bed. The trailer can be used as a conventional tilt bed trailer by simply unlocking the bed hold-down chain 66. However, safer and easier loading is provided particularly for use with heavy loads by rolling the wheels to the front of the trailer.

The shifting axle construction requires a trailer having extreme rigidity in its framework, yet as is well understood, the trailer should desirably be as light in weight as possible and comprise a minimum number of frame elements in order to reduce the fabrication problems and cost as much as possible. The accomplishment of these objectives, however constitute a unique design problem with the instant type of trailer. When the trailer elements are arranged as illustrated in Figure 2 the trailer is suspended as a beam supported at both ends, whereas when the trailer is in the position indicated in Figure 1 the trailer comprises a beam supported at its middle and one end. Further the amount and type of loading on the trailer elements shifts during the shifting of the axle as well as the load.

The necessity for a rigid construction is apparent when the changes in the stresses as well as the point of application of the loads is considered. The instant invention was born of a consideration of these and other problems which experience has indicated to be present in the heretofore known trailers. A trailer constructed in accordance with my invention embodies many advantages not found in the prior trailers, as can be more easily realized by considering the principles of construction as previously described herein, and by further considering the following and referring again to the drawings and particularly to Figure 1.

The tubular cross members 18, 20, 22 and 24 are attached directly to the side rails 12 and 14. Further, the side rails are of I beam formation and the tubular cross members are merged into the webs of the I beams. Similarly, the tubular cross members 16 and 26 are connected to the side rails 12 and 14 as well as to the side members 28 and 30 and 32 and 34, respectively. Preferably the tubular cross members are uniformly longitudinally spaced from each other.

Also, the two cross members 20 and 22 are substantially equally spaced on opposite sides of the wheel wells, and the track 72 which is attached to the cylindrical cross members 18 and 24 is positioned longitudinally central of the trailer.

The resulting structure is a novel departure from that heretofore used in trailers and has a rigidity and stability not previously attained. Furthermore, the construction is obviously simplified. The trailer can be formed of available shapes in a quick and easy manner, the weight can be cut down, and the cost reduced. Yet, despite these advantages, the strength is increased. It is to be particularly noted that the tubular cross members have considerable lateral resistance to bending and have an exceptional torsional rigidity.

The above construction also makes it possible to provide a rigid amply strong trailer which has a low center of gravity and is accordingly more stable in transit and in loading operation than one which would have a higher center of gravity, as the prior known trailers have.

Thus, I have provided a shifting axle trailer which is light in weight, of simple construction, can be cheaply formed, and does not involve a considerable number of parts which will require adjustment or repair, and yet which is safer and more stable than heretofore known trailers.

From the foregoing it will be apparent that I have provided an easy loading shifting axle tilt bed trailer which will have widespread use, which is rugged, light in weight, involves few parts and requires little maintenance, is safer and more stable, and yet which is highly versatile and in fact more versatile than heretofore known trailers of similar nature.

While I have shown and described the preferred form of my invention, it will be understood by those skilled in the art that many changes in form and details of construction can be made within the scope of the appended claims, and I claim an exclusive right to all changes, modifications, and forms coming within the scope of the appended claims.

I claim:

1. A trailer comprising a bed, an axle, a pair of wheels connected to said axle, said bed having wheel wells in which said wheels are received in a normal position, a pair of platforms connected to said bed and positioned adjacent said wells, said platforms extending longitudinally of said trailer and laterally of said axle, said platforms being positioned in a longitudinal plane spaced above said axle a distance less than the radius of said wheels when said wheels are in said wells, said axle being movable longitudinally of said trailer to engage said wheels with said platforms for supporting relationship between said wheels and said trailer bed.

2. A trailer comprising a frame, an axle and a pair of wheels, said wheels being mounted on said axle, said wheels being shiftable with respect to said frame, said axle having bearing means normally supportingly engaged with said frame when said wheels are in a normal trailer towing position, a platform connected to said frame and extending longitudinally with respect to said trailer, said platform being spaced above said axle a distance less than the radius of said wheels when said wheels are in said normal position, said axle being movable under said platform for engagement of said wheels with said platform to transfer the support of said trailer from said bearing means directly to said wheels.

3. A trailer comprising a frame, an axle, a wheel mounted on said axle, said axle having bearing means normally supportingly engaged with said frame, a platform connected to said frame, said platform extending longitudinally with respect to said trailer, said platform being spaced above said axle a distance less than the radius of said wheel, said axle being movable under said platform for engagement of said wheel with said platform to transfer the support of said trailer from said bearing means directly to said wheel.

4. The apparatus of claim 3 including side flanges connected to said axle and extending alongside said frame of said trailer bed and preventing lateral displacement of said axle with respect to said bed.

5. The apparatus of claim 3 including stabilizing means for stabilizing said axle with respect to said frame in all positions of said axle with respect to said frame and when said axle is in normal carrying position comprising means slidably connected to said frame for sliding movement in a direction longitudinally of said frame only.

6. The apparatus of claim 3 including yoke means connected to said frame, said axle being received within said yoke means and bearing against said yoke means when in a normal carrying position, said axle being movable longitudinally with respect to said trailer outwardly of said yoke means.

7. The apparatus of claim 6 including lock means for maintaining said axle in a normal carrying position comprising stabilizing means extending outwardly of said axle, a slide track extending longitudinally of said trailer, a slide mounted on said track for sliding movement longitudinally of said trailer, stabilizing means being connected to said slide, lock means pivotally connected to said trailer and engageable with said slide to maintain said slide in a fixed position with respect to said slide track, said lock means being disengageable from said slide for movement of said axle longitudinally of said trailer.

8. A trailer comprising a frame, an axle extending laterally of said frame, a pair of wheels connected to said axle, means supporting said trailer on said axle, said axle being movable longitudinally of said trailer and stabilizing means for stabilizing said axle during longitudinal movement with respect to said frame comprising a slide track extending longitudinally of said frame, a slide engaged with said track and slidable longitudinally thereof, a member interconnecting said slide and said axle, said member extending laterally of said axle and providing lateral stability of said axle with respect to said trailer.

9. The apparatus as set forth in claim 8 wherein said frame has a pair of yokes connected thereto, said axle bearing against said yokes in a direction longitudinally of said trailer, said axle being movable longitudinally of said trailer out of engagement with said yokes and means for maintaining said axle in engagement with said yokes comprising a lock member pivotally connected to said trailer frame and movable into engagement with said slide for locking said axle in contact with said yokes.

10. The apparatus of claim 9 including means for moving said lock member comprising a rod, means connecting said lock member to said rod, a shaft rotatably mounted on said frame, said rod being threadingly engaged with said shaft, means supporting said rod for longitudinal movement with respect to said shaft upon rotational movement of said shaft, and means for rotating said shaft.

11. The apparatus of claim 10 in which said rod is fixed to a crank, said crank is connected to an axle pivotally mounted on said trailer, and said axle is connected to said lock member.

12. A trailer comprising a frame, an axle, means for supporting said frame vertically above said axle, said axle having a pair of wheels, said axle being movable longitudinally of said frame, said axle having a normal load carrying position, platform means extending longitudinally of said frame, said platform being spaced above said axle a distance less than the radius of said wheels, said axle being movable out of said normal load carrying position longitudinally of said frame to engage said wheels with said platform means in supporting relationship with said frame, means for connecting said trailer to a towing vehicle comprising a hitch frame pivotally connected to the first mentioned frame for pivotal movement about a horizontal axis, said hitch frame being adapted to be in a normal load transmitting position with respect to the first mentioned frame when said axle is in said normal load carrying position for transmission of towing force through said hitch frame to said trailer frame, means for preventing pivotal movement of said hitch frame with respect to the first mentioned frame when said axle is in said normal load carrying position, said hitch frame being pivotal with respect to said trailer frame during movement of said axle forwardly with respect to said trailer frame for pivotal movement of said trailer frame with respect to said axle and said hitch frame.

13. The apparatus of claim 12 including means for stabilizing said axle to maintain said axle in a position transverse with respect to said trailer frame comprising torque arms connected to said axle and slidably connected to said trailer frame for sliding movement in a longitudinal direction with respect to said frame.

14. The apparatus of claim 13 in which said torque arms extend both rearwardly and forwardly with respect to said axle with the torque arms extending in one direction with respect to said axle being pivotally connected to said axle for pivotal movement about a horizontal axis.

15. The apparatus of claim 14 including flange means connected to said axle and positioned adjacent said trailer frame preventing lateral movement of said axle with respect to said frame members.

16. A trailer comprising, in combination, a frame, an axle, means for supporting said frame vertically above said axle, said axle having a pair of wheels, said axle being movable longitudinally of said frame, said frame comprising a pair of longitudinal beam members, wheel wells, said wheel wells being formed in part by a pair of plates, each of said plates being connected to one of said longitudinal beam members, each of said wheel wells having a second frame member and a third frame member connected thereto, the second and said third frame members connected to each of said wells being spaced laterally from the longitudinal frame member connected to the corresponding one of said wells and extending substantially parallel to the latter frame member, said second frame members each being connected to one side of their associated wheel well and said third frame members being connected to the other side of said wheel well, spaced laterally extending cross members interconnecting said two longitudinal beam members and extending laterally thereof and laterally of said frame, spaced lateral end cross members forming the ends of said frame, one of said end cross members being connected to one end of both of said second frame members, the other of said end cross members being connected to one end of both of said third frame members.

17. The combination of claim 16 in which the laterally extending cross members are tubular.

18. The combination of claim 16 in which one of said laterally extending cross members is positioned a fixed distance longitudinally to one side of said wheel wells, and one of said cross members is positioned an equal distance longitudinally on the opposite side of said wheel wells.

19. A trailer frame comprising, in combination, a pair of longitudinally extending frame members spaced laterally of each other on said frame, said longitudinal frame members being connected by lateral tubular frame members spaced along said longitudinal member, said frame having end tubular members interconnecting the opposite ends of said longitudinal frame members.

20. A trailer comprising a pair of spaced longitudinal frame members, a series of tubular lateral members interconnecting said longitudinal frame members, and means forming wheel wells connected to said longitudinal frame members intermediate a pair of said tubular cross members substantially longitudinally centrally of said trailer.

No references cited.